June 24, 1952  H. A. WADMAN  2,601,649
ELECTRONIC THICKNESS GAUGE
Filed Aug. 2, 1948
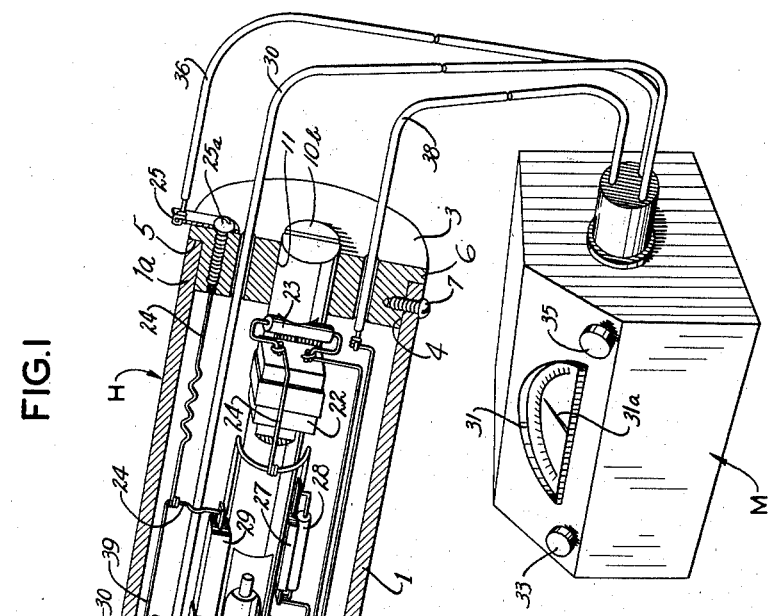
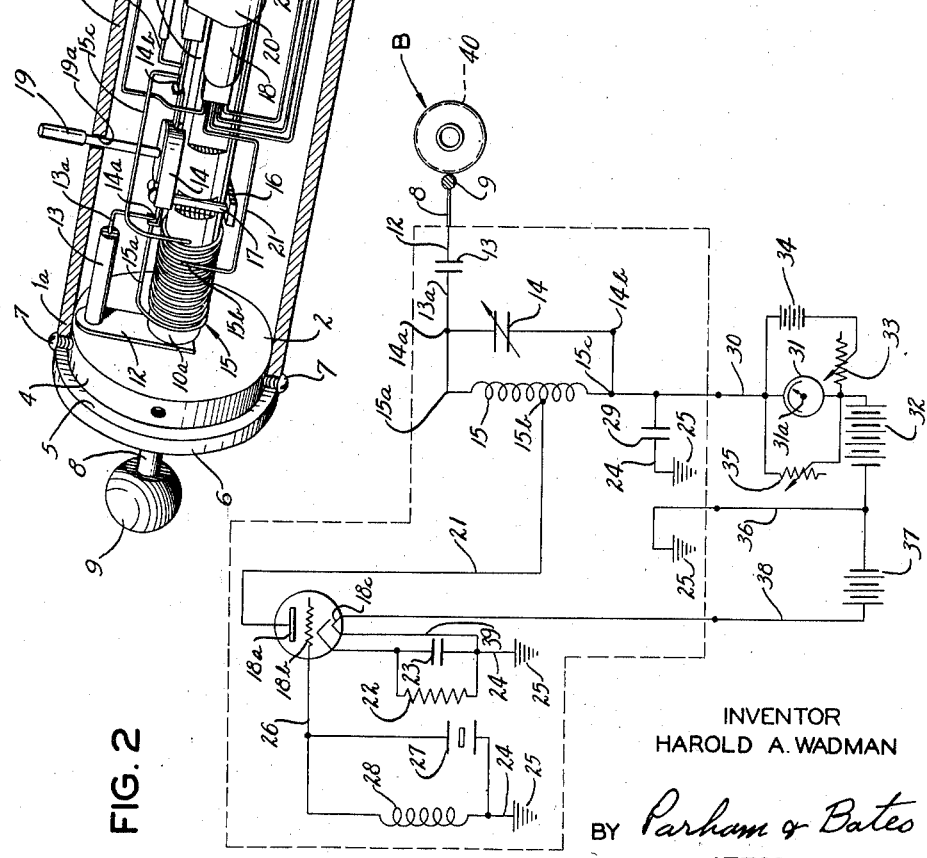
INVENTOR
HAROLD A. WADMAN
BY Parham & Bates
ATTORNEYS Patented June 24, 1952

2,601,649

UNITED STATES PATENT OFFICE 2,601,649

ELECTRONIC THICKNESS GAUGE

Harold A. Wadman, West Hartford, Conn., assignor to Emhart Manufacturing Company, a corporation of Delaware Application August 2, 1948, Serial No. 42,013

5 Claims. (Cl. 175—183)

The present invention relates to method and apparatus for measuring thickness of walls which are formed of a dielectric material, particularly walls of narrow neck containers and the like, where one wall surface is inaccessible or difficult of access. The difficulty in checking or measuring the wall thickness of glass bottles and carboys, the inside surface of which cannot be reached readily, is apparent.

Heretofore, various methods have been suggested for checking thickness of dielectric walls having inaccessible surfaces. One such method consists in measuring the mutual electrostatic capacity which is created by placing one surface of a wall of dielectric material in contact with or at a controlled distance from two electrodes or capacitors. When the dielectric material is placed in the measuring position, the mutual electrostatic capacity of the two electrodes is increased by the presence of the dielectric material. By measuring the mutual capacity, an indication of the thickness of the material is obtained.

A two electrode system has the disadvantage of requiring a compromise in the location of the electrodes. If the electrodes are placed too close together in comparison with the average thickness of the wall to be measured, then the capacity will change by only a very small percentage when the thickness of the wall is varied. On the other hand, if the electrodes are too far apart, the total capacity will depend upon the average thickness over a considerable area and not be sensitive to variations within that area.

A further disadvantage of systems heretofore suggested has resided in their dependency upon proper location of the dielectric with respect to the gauging electrode or electrodes. If the electrodes are not always located in the same pattern or relationship with respect to each other and to the dielectric, the deviations from that pattern establish different mutual capacitances for the same electrodes and portion of the dielectric article. In order for changes in mutual capacitance accurately to indicate only differences in thickness of a dielectric wall, the configurations of the electrodes and the contiguous surface of the dielectric wall as well as the arrangement of those configurations relative to each other always must be the same. In addition, the distance between all surface points in proximity to the point or points of contact, or points of least distance between the electrodes and the dielectric article, must be held constant.

An object of the present invention is to eliminate these and other disadvantages and provide improved apparatus including a single detector electrode for accurately measuring thickness, or variations in thickness, of an adjacent dielectric wall in response to variations in the mutual capacitance of the electrode and the wall.

Another object is to provide improved single electrode gauging apparatus which may be portable and the electrode of which always presents the same configuration to a contacted or a contiguous dielectric wall.

A further object is the provision of a single electrode portable measuring device including an electrical system which is extremely sensitive to the very slight changes in thickness within a critical range and is adaptable to high speed accurate gauging.

Other objects of the invention will become apparent from the following description made with reference to the accompanying drawing in which:

Figure 1 is a perspective view of apparatus, embodying the present invention, including a spherical electrode and a hollow handle which is broken away to show the arrangement of detector elements therein; and Fig. 2 is a wiring diagram of the measuring circuit utilized in the apparatus shown in Fig. 1.

Generally, the invention provides novel apparatus for determining the thickness, or variations in the thickness, of a wall of dielectric material by observing the effect of the wall upon the electrostatic capacitance of a single spherical electrode when portions of an accessible surface of the wall are successively contacted by the electrode.

The embodiment of the invention illustrated in the drawing is intended for measuring the thickness of the walls of glass bottles or the like and detecting undesirably thin or thick spots in the bottle wall.

Referring to Fig. 1, the measuring apparatus includes a hollow handle, generally designated H, which may comprise a length of pipe 1 formed of brass or other good electrical conducting metal one end of which is closed by a circular cap or cover 2 formed of polystyrene or other insulating material, and the other end of which is closed by a similar cap or cover 3 formed of a conducting material such as brass.

Each of the end covers 2 and 3 are annularly recessed to provide a lesser diameter portion 4 which snugly fits into the pipe 1; a shoulder 5 which abuts the end of the pipe; and a greater diameter portion 6 the peripheral surface of which forms a smooth continuation of the cylindrical outer surface 1a of the pipe 1. The reduced diameter portions 4 of the end covers 2 and 3 may be removably secured in the pipe 1 (Fig. 1) by screws 7 or other suitable fasteners.

Secured to and extending axially through and outwardly from the end member 2 is an electrode supporting rod 8 on the outer end of which is integrally formed or affixed a generally spherical electrode 9. The purpose of the supporting rod 8 is to locate the spherical electrode 9 removed from the handle H by means of the smallest possible connection to the handle consistent with adequate structural support. The support 8 locates the ball 9 at a considerable distance, as, for example, two or more diameters of the ball, from the end member 2, and the supporting rod 8, itself, is considerably smaller in diameter than the ball 9 as, for example, one-fourth the diameter of the ball 9 or less. The electrode 9 and supporting rod 8 may be formed of brass or other material which is a good electrical conductor.

The rod 8, which extends axially through the end member 2 into the interior of the handle H, supports and is secured in one end 10a of a polystyrene rod 10 which extends axially through the handle H and is removably supported at its rear end 10b by an axially disposed bore 11 in the rear end member 3.

Mounted on the rod 10 and shielded within the brass pipe 1 of the handle are components of a crystal oscillating circuit. More particularly, these components include a conductor strip 12 which is secured on the rod 8 between the end member 2 and rod 10 and electrically connects the rod 8 and affixed electrode 9 through a fixed block condenser 13 and wire 13a to terminal 14a of a variable condenser 14 and to end 15a of an inductance coil 15 which is wound around the polystyrene rod 10. The variable condenser 14 may be mounted on the rod 10 as by means of a clamping plate 16 and screws 17. Adjustment of the condenser 14 may be effected by means of a screw driver 19 or similar tool passed through a hole 19a located in the pipe or casing 1 in axial alignment with an adjustment member (not shown).

As shown in Fig. 2, plate 18a of a triode tube 18, which is strapped to rod 10 as at 20 (Fig. 1), is connected through a line 21 to a point 15b intermediate the ends 15a and 15c of the inductance coil 15. The triode 18 is connected as a Pierce-Miller crystal oscillator with cathode bias supplied by a resistor 22 which is shunted by a condenser 23 to provide a path for radio-frequency current to flow through line 24 to ground terminal 25 (Fig. 1) without passing through the resistor 22. As shown in Fig. 1, ground terminal 25 is secured by screw 25a to the outer surface of the polystyrene end member 3 and thus insulated from the brass handle casing 1.

Line 26 connects triode grid 18b to the ground line 24 through a piezo-electric oscillator crystal 27 and a radio frequency choke 28 which are connected in parallel and mounted on rod 10.

Terminals 14b and 15c of the variable tuning condenser 14 and the inductance coil 15, respectively, are connected through a condenser 29 to the ground line 24 and through line or lead 30, which extends outwardly through the end member 3, into a meter box generally designated M.

As shown in Fig. 2, lead 30 is connected through an ammeter 31 to the positive terminal of a battery 32 or other source of electric current for supplying the plate voltage necessary for the oscillation of triode 18. A variable resistor 33 and a battery 34 are connected in series across the meter 31 so that current from battery 34 opposes current from battery 32 and provides means for making the meter 31 read zero either when the capacitance of the ball electrode 9 is uneffected or effected a predetermined amount by the presence of a dielectric.

Meter 31 also is shunted by a variable resistor 35 which provides a convenient means for adjusting the instrument's sensitivity.

The oscillator circuit for the triode plate 18a is completed through a line or lead 36 which connects the negative or ground terminal of the battery 32 with the ground terminal 25.

The ground lead 36 also is connected to the negative terminal of a battery 37, the positive terminal of which is connected through a lead 38 to triode filament 18c. The circuit for supplying current to light the filament 18c is completed through a line 39 which connects the filament to the ground line 24.

In the crystal oscillator circuit heretofore described, the radio frequency choke 28 provides a path to ground for the rectified grid current that flows when the grid is on the positive part of a cycle. The condenser 23 provides a path for the radio frequency current to flow to ground without passing through the resistor 22, thus precluding excessive degeneration in the circuit which might prevent oscillation.

The condenser 29 provides a return path for the radio frequency current to flow to ground and prevents it having to flow through the meter 31. The condenser 13 prevents the voltage from the battery 32 or other source of current from appearing on the electrode 9, thus preventing shocks to operators, or discharge of the battery through inadvertent touching of the electrode to ground.

In operating the illustrated and described gauging device, the variable condenser 14 is tuned by means of the screw driver 19 so that the parallel circuit consisting of the condenser 14 and the inductance 15 is very slightly inductive at the parallel resonant frequency of the piezo-electric crystal 27 under which conditions the circuit oscillates in the Pierce-Miller manner.

If now the handle H is gripped by the operator and moved to position the ball electrode 9 adjacent or in contact with a dielectric article such as a bottle B, the wall 40 of which is to be measured for thickness, the capacitance of the electrode 9 is increased. Inasmuch as an increase or decrease in the capacitance of the ball electrode 9 correspondingly changes the reactance of the tuned circuit and the oscillations of the triode 18 so that a change in the average plate current is effected and indicated by the meter 31. Changes in the reading of the meter effected by contact of the electrode 9 with different points of bottle wall 40 indicate the difference in thickness of the wall 40 at the several points contacted.

The meter may be calibrated so as to read in units of thickness rather than current. Inasmuch as the electrode 9 is substantially spherical, it always presents the same configuration to the portion of the dielectric wall 40 adjacent the point of contact regardless of the angle at which the handle H is held relative to the wall. Providing the portions of the dielectric wall 40 contacted by the electrode 9 have the same curvature, the reading of the meter 31 accurately indicates wall thickness. This accuracy is substantially retained at points of different curvature of the dielectric wall where the curvature is considerably greater than that of the electrode 9, and particularly so for convex walls.

The variable resistor 33 may be adjusted so that the current through the meter 31 from battery 34 balances the current from battery 32 (or similar sources of current) and a zero reading of the meter established. The zero reading may be established when the electrode 9 is remote from, and its capacity unaffected by, a dielectric (in which case the meter 31 indicates actual thickness at the points at which the electrode is subsequently brought in contact with the dielectric wall 40) or the zero reading may be established with electrode 9 in contact with a portion of the wall 40 having a predetermined desired thickness (in which case readings subsequently taken at different points of unknown thickness directly indicate plus and minus deviations from the desired thickness).

The sensitivity of the instrument may be conveniently adjusted merely by varying the resistance of the resistor 35 so as to obtain a desired swing of the meter pointer or needle 31a when the electrode 9 is brought into contact, successively, with two dielectric wall portions having a known difference in thicknesses. Preferably, the adjustment of each resistor 33 and 35 should be repeated to correct for changes affected by adjustment of the other until true readings are obtained for both.

It should be understood, that the triode plate 18a may be connected to the end 15a of the inductance coil 15, although the connection preferably is made to the tap 15b (as in the illustrated embodiment) so as to reduce the effect of variations in the plate-cathode capacity on the operation of the instrument.

It also should be apparent that the invention is not limited to the use of the triode tube 18 and that tetrode and pentode tubes may be substituted if desired.

The preferred embodiment of the invention illustrated in the drawing provides a readily portable thickness gauge having a single electrode 9 which manually may be brought into thickness gauging contact with a dielectric wall 40 by means of a handle H which conveniently contains and shields the sensitive components of a preferred crystal oscillator circuit.

The single electrode 9 is constructed and arranged so that in placing it in contact with the wall which is to be gauged for thickness, the angle at which the handle H is disposed to the wall is substantially immaterial. Thickness readings may be visually indicated by the meter 31 directly in desired thickness units without computation or translation from current units.

Other advantages of the invention and its adaptability to other uses will be apparent. It will be understood that the specific embodiment shown and described is illustrative and that various modifications may be made within the scope and spirit of the invention as defined by the appended claims.

I claim:

1. Apparatus for gauging the thickness of a wall of dielectric material which includes a metallic handle, a single generally spherical electrode supported at a point spaced from the handle and insulated therefrom with which said electrode is movable into juxtaposition to said dielectric wall, a high frequency oscillator mounted in and grounded to said handle, a source of current located externally of said handle and connected in the oscillator circuit, the current of said oscillator varying responsively to changes in the capacitance of said single electrode produced by a change in thickness of the dielectric wall adjacent to the electrode, and a meter for measuring the average oscillator current.

2. The apparatus recited in claim 1 and including an additional source of current opposing the flow of current from the first source through the meter.

3. The apparatus recited in claim 2 and including a variable resistor for adjusting the amount of current from said additional source.

4. The apparatus recited in claim 3 and including a second variable resistor shunted across said meter.

5. The apparatus recited in claim 1 and wherein the oscillator has a cathode resistor bias.

HAROLD A. WADMAN.

REFERENCES CITED

UNITED STATES PATENTS

The following references are of record in the file of this patent:

| Number | Name | Date |
| --- | --- | --- |
| 2,032,016 | Hitner | Feb. 25, 1936 |
| 2,061,115 | Tebo et al. | Nov. 17, 1936 |
| 2,076,944 | Howe | Apr. 13, 1937 |
| 2,177,528 | Kidd | Oct. 24, 1939 |
| 2,222,221 | Burford | Nov. 19, 1940 |
| 2,241,190 | Fenning | May 6, 1941 |
| 2,285,152 | Firestone | June 2, 1942 |
| 2,297,346 | Crist | Sept. 29, 1942 |
| 2,360,857 | Eldredge | Oct. 24, 1944 |